United States Patent
Saliba (10) Patent No.: US 7,515,987 B2
(45) Date of Patent: Apr. 7, 2009

(54) MEDIA LIBRARY ASSEMBLY HAVING FIRST DATA TRANSFER ASSEMBLY THAT RECEIVES FIRST COMMAND SIGNAL AND TRANSMITS SECOND COMMAND SIGNAL TO SECOND DATA TRANSFER ASSEMBLY TO DECREASE TIME-TO-DATA

(75) Inventor: George A. Saliba, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 278 days.

(21) Appl. No.: 11/362,967

(22) Filed: Feb. 27, 2006

(65) Prior Publication Data

US 2007/0204123 A1  Aug. 30, 2007

(51) Int. Cl.
*G06F 7/00* (2006.01)
*G06F 12/00* (2006.01)

(52) U.S. Cl. .................. 700/213; 360/98.04; 369/30.06; 700/154; 700/4; 700/11

(58) Field of Classification Search .............. 369/30.06; 711/154, 165, 4, 5, 111; 360/98.04; 700/213
See application file for complete search history.

(56) References Cited

U.S. PATENT DOCUMENTS 5,883,864 A * 3/1999 Saliba ....................... 360/92.1
6,085,975 A * 7/2000 Irvine et al. ................. 235/383
6,766,412 B2   7/2004 Bolt
2002/0144048 A1* 10/2002 Bolt ............................. 711/4
2004/0148482 A1* 7/2004 Grundy et al. .............. 711/167

* cited by examiner

Primary Examiner—Hong Kim
(74) Attorney, Agent, or Firm—Roeder & Broder LLP; James P. Broder (57) ABSTRACT

A media library assembly (10) includes a host controller (12), a first data transfer assembly (18A) and a second data transfer assembly (18B), which can be remotely positioned from the first data transfer assembly (18A). The host controller (12) sends a first command signal to the first data transfer assembly (18A) to request a transfer of a first block of data relative to a target storage media (22). The first data transfer assembly (18A) receives the first command signal, determines the location of the target storage media (22), and initiates a second command signal to the second data transfer assembly (18B) to request the transfer of the first block of data relative to the target storage media (22). The second data transfer assembly (18B) transfers the first block of data relative to the target storage media (22) in response to the second command signal. The first data transfer assembly (18A) then returns a status to the host controller (12) regarding the transfer of the first block of data. The first block of data can be transmitted between the first data transfer assembly (18A) and the second data transfer assembly (18B) via an Ethernet connection, a Fibre Channel connection, or via the Internet, over wired or wireless connections. The second command signal occurs transparently to the host controller (12).

51 Claims, 6 Drawing Sheets

MEDIA LIBRARY ASSEMBLY HAVING FIRST DATA TRANSFER ASSEMBLY THAT RECEIVES FIRST COMMAND SIGNAL AND TRANSMITS SECOND COMMAND SIGNAL TO SECOND DATA TRANSFER ASSEMBLY TO DECREASE TIME-TO-DATA

BACKGROUND

Storage media suitable for storing vast amounts of information content include streaming tape cartridges. Streaming tape drives are used to transfer multiple blocks of user data to and from the tape cartridges in a single streaming operation, rather than as a series of start-stop operations. Streaming tape is particularly well suited for backup operations as well as for providing archival and retrieval operations for vast quantities of information.

For even greater storage capacity, one or more tape drives and multiple tape cartridges can be positioned within a tape library. To manage such a vast amount of information, a central cartridge inventory can be maintained by a library controller within the library, so that logical requests for a particular drive and cartridge may be translated by the library controller into physical device locations and electromechanical operations, for example. A robotic arm can be elevated and rotated to a particular cartridge storage slot in order to move the cartridge from the slot and into a loading tray of the selected tape drive. The drive can then load the cartridge and thread the tape for recording/playback operations, following initial setup and calibration routines conventional with tape drives. The drive may be one of several drives within the library accessible by the robotic arm.

In addition, two or more libraries can, in effect, be linked using either a shared transport assembly or a progressive transport assembly. The shared transport assembly is a single transport mechanism that extends between multiple libraries to allow a cartridge to be passed from one library through to another library. The progressive transport assembly involves multiple robotic mechanisms, with a first robotic mechanism passing a cartridge from a first library to a second library, and a second robotic mechanism then passes the cartridge to a third library, etc., until the cartridge reaches its final destination.

One drawback of these types of libraries is the time delay incurred between receiving the tape cartridge request and having the cartridge ready for user data operations at the selected tape drive. Another drawback of this prior approach is that a single robotic arm mechanism services hundreds, if not thousands, of tape cartridge slot locations, and any failure of any of the robotic arm mechanisms essentially can interrupt or completely cease operation of the entire system. Further, this prior approach can limit scalability to the extent of selectively filling up the available tape cartridge slots with similar tape cartridges, or alternatively, with the cumbersome addition of similar tape libraries.

Each added library can also require relatively complex and costly reconfiguring of the entire library system. In addition to intricate mechanical and electrical coupling of the new libraries to existing libraries, physical space limitations may also be a concern. Further, physically linking libraries can impose certain proximity requirements on the actual positioning of the libraries relative to one another. Moreover, this type of linked library system can significantly increase the time-to-data, thereby reducing productivity and efficiency. Additionally, as new types of libraries continue to be developed and manufactured, linkage between older libraries and these modernized libraries can present serious compatibility and/or logistical challenges.

SUMMARY

The present invention is directed toward a media library assembly for use with a plurality of storage media including a target storage media. In one embodiment, the media library assembly includes a host controller, a first data transfer assembly and a second data transfer assembly. The host controller sends a first command signal to the first data transfer assembly to request a transfer of a first block of data relative to the target storage media. The first data transfer assembly is configured to receive the first command signal, determine the location of the target storage media, and initiate a second command signal to the second data transfer assembly to request the transfer of the first block of data relative to the target storage media.

The second data transfer assembly includes a second data transfer device that receives the target storage media. The second data transfer assembly is configured to transfer the first block of data relative to the target storage media in response to the second command signal. The first data transfer assembly then returns a status to the host controller regarding the transfer of the first block of data. The status of the transfer can include providing the first block of data to the host controller. In addition, or in the alternative, the status can include a confirmation that the first block of data was written to the target storage media.

In one embodiment, the first data transfer assembly and/or the second data transfer device can be a tape drive. Alternatively, the first data transfer device can be an emulated media drive. The first media transfer assembly and the second media transfer assembly can be substantially identical to one another or they can be different from one another. The first data transfer assembly can be included in a first media library, while the second data transfer assembly can be included in a second media library that is remotely positioned from the first media library. The first block of data can be transmitted between the first data transfer assembly and the second data transfer assembly via an Ethernet connection, a Fibre Channel connection, via the Internet, or via any other suitable connection. Moreover, the first block of data can be transmitted wirelessly between the first data transfer assembly and the second data transfer assembly. In addition, the second command signal occurs transparently to the host controller.

The present invention is also directed to one or more methods for transferring a block of data between a host controller and a target storage media.

BRIEF DESCRIPTION OF THE DRAWINGS

The invention, together with further advantages thereof, may best be understood by reference to the following description taken in conjunction with the accompanying drawings, taken in conjunction with the accompanying description, in which similar reference characters refer to similar parts, and in which.

DESCRIPTION

Figure 1:
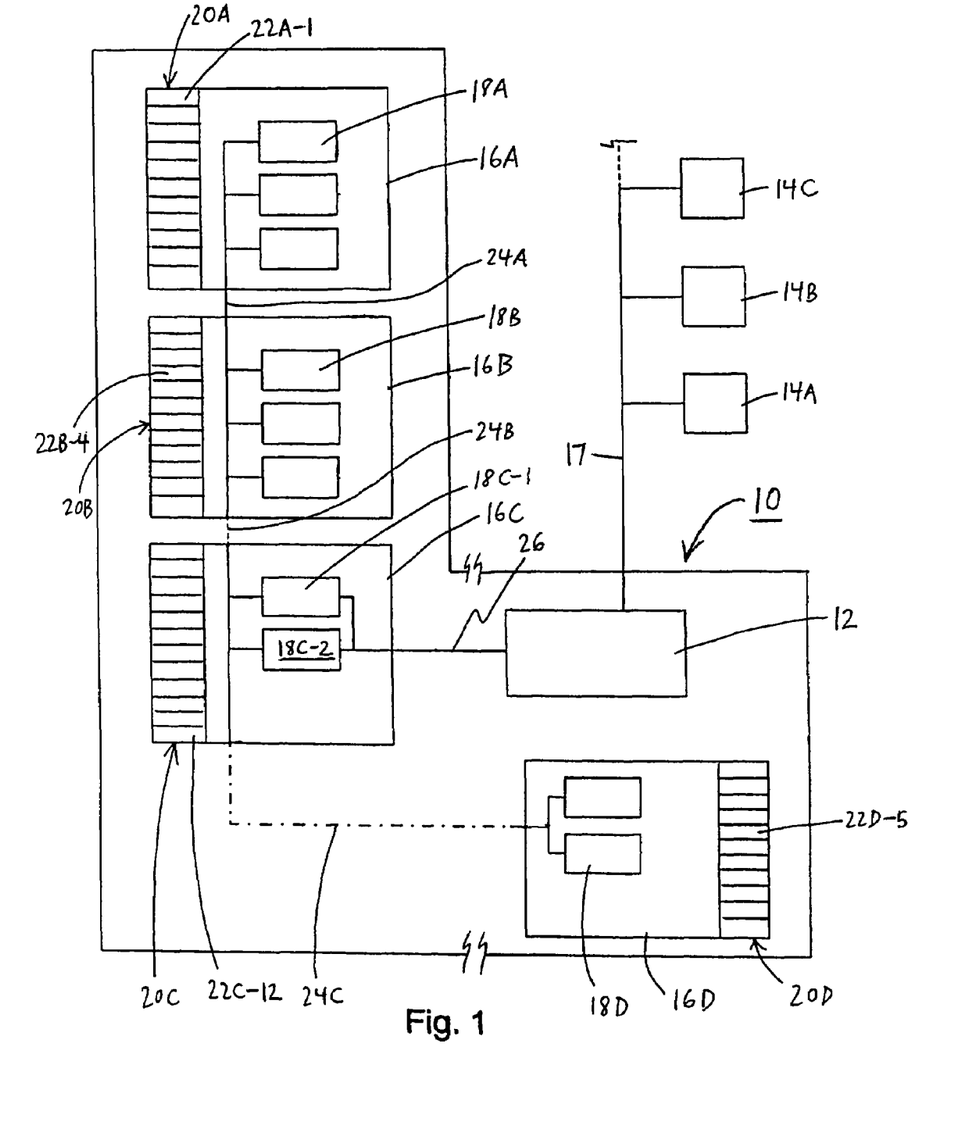
FIG. 1 is a simplified block diagram of one embodiment of a media library assembly having features of the present invention including a host controller and a plurality of communicatively connected media libraries, and a plurality of clients in communication with the media library assembly.

FIG. 1 is a simplified block diagram of an exemplar media library assembly 10. In the embodiment illustrated in FIG. 1, the media library assembly 10 includes one or more host controllers 12, one or more clients 14 (three clients 14A-C are shown in FIG. 1), and one or more media libraries 16 (four media libraries 16A-D are shown in FIG. 1). It is recognized that the number of host controllers 12, clients 14 and media libraries 16 illustrated in FIG. 1 is for ease of discussion only, and that any suitable number of each such structure can be utilized with the present invention.

The host controller 12 can include one or more computer systems, data processing systems, routers, networks and/or servers, as non-exclusive examples. Further, the host controller 12 can physically be located proximate one or more of the clients 14A-C and/or one or more of the media libraries 16A-D. Alternatively, the host controller can be remotely positioned relative to the clients 14A-C and/or the media libraries 16A-D.

The clients 14A-C can be any suitable computing systems such as personal computers, personal digital assistants, etc., as non-exclusive examples. The clients 14A-C can be utilized by end users requiring data to be retrieved from or written to one of the media libraries 16A-D. The host controller 12 is communicatively linked with the clients 14A-C via a client communication link 17. The client communication link 17 can be any one of several communication links known to those skilled in the art, such as a standard wired (SCSI, Fibre Channel or other suitable cabling) or a wireless communications link. In the embodiment illustrated in FIG. 1, each media library 16A-D includes one or more data transfer assemblies 18A-18D, one or more storage media retainers 20A-D and a plurality of storage media 22A-n through 22D-n (representative examples of storage media 22A-1, 22B-4, 22C-12 and 22D-5 are identified in FIG. 1). As provided herein, each media library 16A-D can be communicatively linked with the host controller 12 and/or one or more other media libraries 16A-D in a manner that decreases the time required to access stored data from and/or write data to the storage media 22A-D stored within the media libraries 16A-D.

In this embodiment, the media libraries 16A-D include a first media library 16A, a second media library 16B, a third media library 16C and a fourth media library 16D. In one embodiment, the media libraries 16A-D can be substantially identical to one another. Alternatively, the media libraries 16A-D can be different from one another. The differences between the media libraries 16A-D can include size, capacity, manufacturer and types of storage media 22A-D utilized, as non-exclusive examples. For example, the media libraries can include autoloaders such as a Superloader 3™, or other suitable libraries such as the PX720, PX510, M2500, M1800, M1500, etc, manufactured by Quantum Corporation. It is recognized that any of the media libraries can be the first, second, third or fourth media library, and that these terms are provided for ease of discussion only. Further, it is understood that each media library 16A-D is able to provide and receive communications and supply available information regarding the storage media being stored within the particular media library 16A-D.

The relative location of the media libraries 16A-D can be varied. For example, the media libraries 16A-D can all be located in one on-site, central location, such as a single storage room or data storage facility. Alternatively, one or more of the media libraries 16A-D can be located in a separate room from one or more of the other media libraries 16A-D. Still alternatively, one or more of the media libraries 16A-D can be located off-site in a completely separate structure. In yet another embodiment, one or more media libraries 16A-D can be located in another state, province or country, or on another continent from one or more of the remaining media libraries 16A-D.

Some or all of data transfer assemblies 18A-D can selectively receive one or more of the storage media 22A-D for performing various read and/or write operations relative to the storage media 22A-D. The number and type of data transfer assemblies 18A-D included in each media library 16A-D can vary from media library 16A-D to media library 16A-D, or within a given media library 16A-D. In one embodiment, the ratio of data transfer assemblies 18A-D to storage media 22A-D is greater than approximately 1:10. However, depending upon the design requirements of the media library assembly 10, this ratio can be greater or less than 1:10. It should be understood that in general, the greater the ratio, the better the performance of the media library assembly 10.

As provided in greater detail below, while some or all of the data transfer assemblies 18A-D can transfer data from or to one of the storage media 22A-D, one or more data transfer assemblies 18A-D may not be configured to receive one of the storage media 22A-D, and may therefore be incapable of performing reading and/or writing operations. The specific functions of the data transfer assemblies 18A-D included in the media library assembly 10 are determined in accordance with the design requirements of the media library assembly 10.

The type and size of the storage media 22A-D utilized within the media libraries 16A-D can vary. For example, the storage media 22A-D can include DLT™ tape media, LTO Ultrium™ media, DAT/DDS media, Travan™ media, SDLT™ tape media, etc., as non-exclusive examples.

As illustrated in the embodiment shown in FIG. 1, the media library assembly 10 can also include a plurality of library communication links 24A-C that allow communication between the media libraries 16A-D. In the embodiment illustrated in FIG. 1, the library communication links 24A-C between the media libraries 16A-D can be varied, and can include one or more different types of library communication links 24A-C within the media library assembly 10. For example, in this embodiment, the media library assembly 10 can include a first library communication link 24A (illustrated as a solid line), a second library communication link 24B (illustrated as a dashed line), and a third library communication link 24C (illustrated as a dot-dash line). Alternatively, the type of library communication links 24A-C between the media libraries 16A-C can be substantially identical to one another.

In the embodiment illustrated in FIG. 1, the first library communication link 24A allows communication between the first media library 16A and the second media library 16B, the second library communication link 24B allows communication between the second media library 16B and the third media library 16C, and the third library communication link 24C allows communication between the third media library 16C and the fourth media library 16D. As non-exclusive examples, one or more of the library communication links 24A-C can be SCSI, Ethernet, Fibre Channel or Internet communication links, or any other suitable communication link generally known to those skilled in the art. Further, the library communication links 24A-C can be either wired or wireless communication links.

In the embodiment illustrated in FIG. 1, the media library assembly 10 includes one or more host communication links 26 that link the host controller 12 to one or more of the media libraries 16A-D. As non-exclusive examples, the host communication link 26 can be SCSI, Ethernet, Fibre Channel or an Internet communication link. Further, the host communication link 26 can be either wired or wireless.

Figure 2:
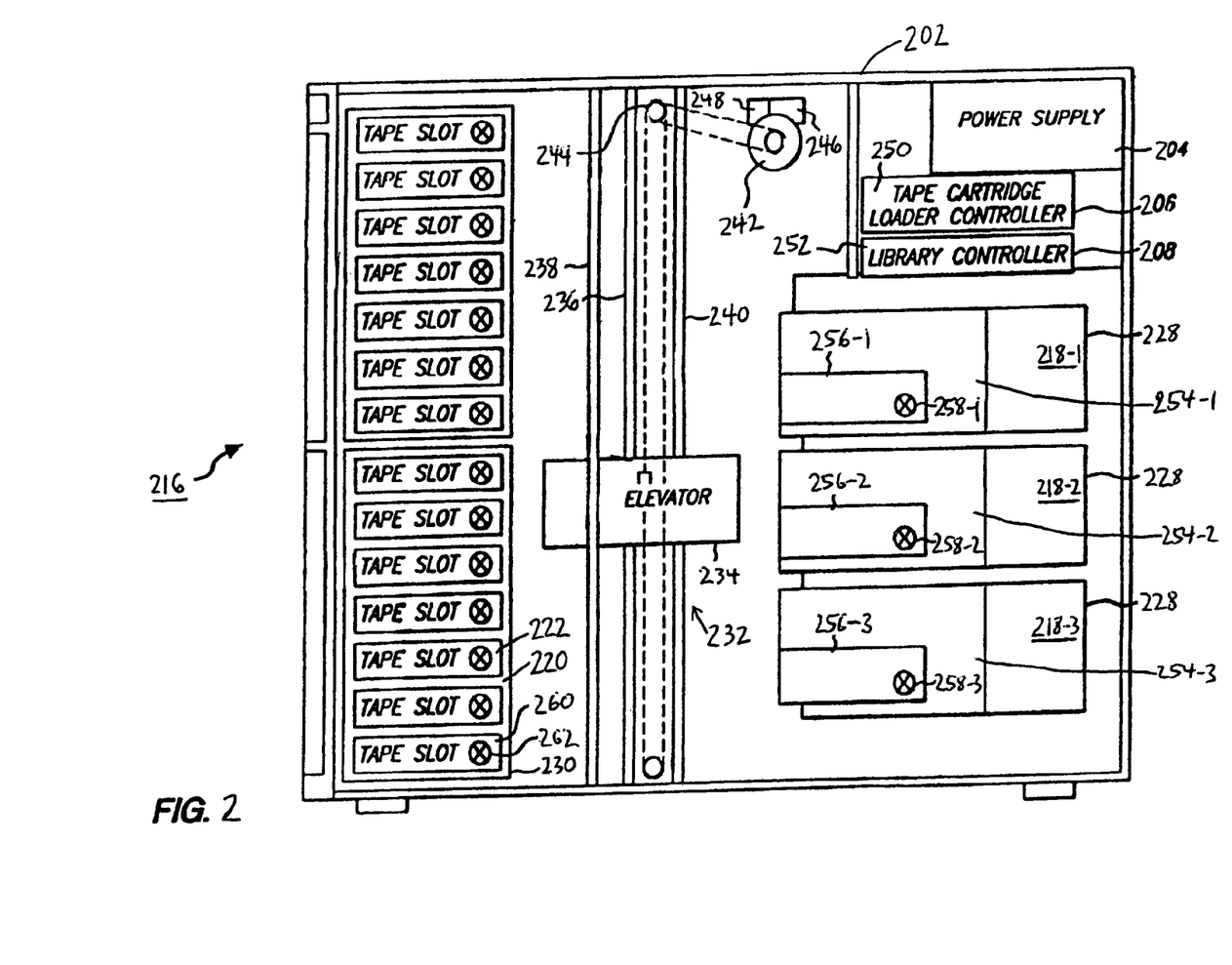
FIG. 2 is a block diagram of one representative embodiment of one of the media libraries illustrated in FIG. 1.

FIG. 2 is a simplified block diagram of one embodiment of a media library 216 such as that illustrated in FIG. 1, in the form of a multi-drive, mass storage and retrieval tape library/loader unit. Although the media library shown and described relative to FIG. 2 is specifically described as a tape cartridge library, it is to be understood that the present invention is equally applicable for use with any other suitable types of libraries using other types of media, such as optical disk libraries, emulated tape cartridge libraries, etc., as non-exclusive examples. However, for ease of discussion, FIG. 2 and various other Figures herein are sometimes described using tape cartridges as the applicable storage media, although this is not intended to restrict or limit the present invention in any manner.

In one embodiment, the media library 216 includes a housing 202, a power supply 204, a storage media loader controller slot 206, a library controller slot 208, a plurality of data transfer assembly slots 228, one or more storage media retainer slots 230, a storage media mover 232 including a storage media pass-through and/or rotating elevator 234, at least one storage media elevator guide shaft 236, a drive shaft 238, a rack drive shaft 240, a storage media elevator motor 242, a pulley drive assembly 244, a roller drive shaft motor 246, and a rack drive shaft motor 248. It is recognized, however, that many different types of storage media movers 232 can be utilized in the media library 216, and that the storage media mover 232 provided herein is merely representative of one such type and is not intended to limit the scope of the present invention in any manner. The housing 202 may be constructed of any number and/or type of conventional materials such as, for example, those utilized in industry standard rack mount cabinets.

In this embodiment, the power supply 204 provides electrical power to the storage media loader controller slot 206, library controller slot 208, the plurality of data transfer assembly slots 228, the storage media elevator motor 242, the roller drive shaft motor 246, and/or the rack drive shaft motor 248. The power supply 204 is interfaced with these components as well as with an external power source using industry standard cabling and connections (not shown).

The media library 216 further includes a tape cartridge loader controller 250 and a library controller 252. The storage media loader controller slot 206 receives the storage media loader controller 250, and the library controller slot 208 receives the library controller 252. In one embodiment, the storage media loader controller 250 can include a standard driver interface unit for receiving digital commands and translating the commands into driving currents, such as step pulses for controlling stepper motors. Further, the library controller 252 can include a standard programmable general purpose computer formed on a single plug-in card unit and preferably includes a programmed microprocessor or microcontroller according to the present invention, memory, communication interface, control interface, connectors, etc. The media library 216 can use well-known industry standard cabling and communication protocols between the storage media loader controller 250, the library controller 252 and/or the other components of the media library 216. Cabling and electrical characteristics including signaling protocols can be generally standardized, and the logical message protocols can be either proprietary or standardized as known to those skilled in the art.

Alternatively, the loader controller 250 may be included as circuitry within or on the library controller card 252. The media library 216 may be operated by means of the cartridge loader controller 250 and library controller 252 for use in conventional data processing.

Each of the data transfer assembly slots 228 receives one of the data transfer assemblies 218-1, 218-2, 218-3. As provided herein, each data transfer assembly 218-$n$ can include a data transfer device 254-$n$ such as a tape drive (i.e. Quantum DLT 2000XT™, DLT4000™, DLT7000™, DLT8000™, DLT VS80™, DLT VS160™, SDLT 320™, SDLT 600™, LTO-2™, LTO-2 HH™, LTO-3™, or equivalent, as non-exclusive examples). Hereinafter data transfer device and tape drive are used interchangably (shown by reference numbers x54 in the drawings), and it is to be understood that the data transfer device described herein can include other suitable devices adapted for use with different types of storage media, such as optical media drives, etc.

The data transfer assemblies 218-1, 218-2, 218-3 within the media library 216 can be substantially identical to one another. Alternatively, one or more of the data transfer assemblies 218-1, 218-2, 218-3 within the media library 216 can be different from the remaining data transfer assemblies in the media library 216.

Each tape drive 254-1, 254-2, 254-3 (generically referred to as 254) includes a storage media slot 256-1, 256-2, 256-3 (generically referred to as 256) and a corresponding storage media sensor 258-1, 258-2, 258-3 (generically referred to as 258) within the slot 254 which generates a storage media presence signal. This signal from one tape drive 254 can be provided to another tape drive in the same media library 216 or in a different media library 216.

Each of the storage media retainer slots 230 can receive a standard storage media retainer 220, such as a storage media retainer as one non-exclusive example, which includes a plurality of storage media slots 260. Each slot is designed to receive one of the storage media cartridges 222 (sometimes referred to herein simply as "storage media"), which are each adapted for use in the media library 216. The storage media retainer 220 includes a storage media presence flag 262 within each storage media slot 260 which provides an indication of the presence or absence of a storage media cartridge 222.

In the embodiment illustrated in FIG. 2, the storage media mover 232 is positioned within the housing 202 between the plurality of storage media slots 260 and the plurality of storage media retainer slots 230. In this manner, the storage media mover 232 is able to load and unload storage media 222 to and from all of the data transfer devices 254 and storage media retainers 220 within a given media library 216.

FIGS. 3A-3D illustrate simplified representations of several embodiments of the data transfer assemblies 318A-D and the host controller 312. For example, in the embodiment illustrated in FIG. 3A, the data transfer assembly 318A includes a data transfer device 354A (such as a tape drive, as one non-exclusive example) and a separate data transfer device interface 364A. The data transfer device interface 364A transmits data between the data transfer device 354A and the host controller 312 via the host communication link 326A. In this embodiment, the data transfer device interface 364A is connected to the host controller 12 via any suitable host communication link 326A (i.e. Fibre Channel, Ethernet connection, etc.) for data flow between the data transfer device interface 364A and the host controller 312. The library communication link 324A allows data to flow between the data transfer assembly 318A and another data transfer assembly 318 in the same or different media library 16A-D (illustrated in FIG. 1).

Figure 3A:
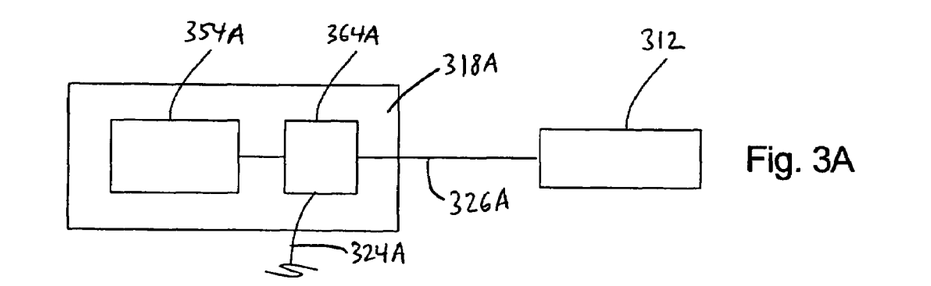
FIG. 3A is a simplified block diagram of the host controller and one embodiment of the data transfer assembly.
Figure 3B:
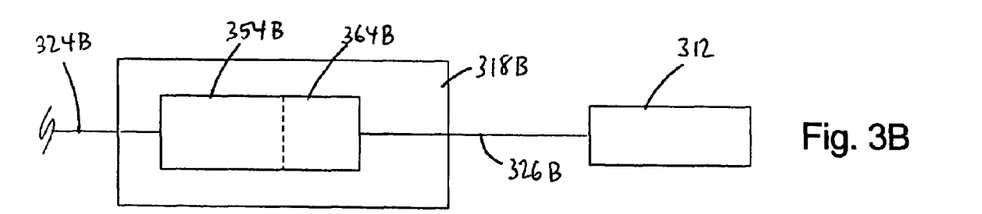
FIG. 3B is a simplified block diagram of the host controller and another embodiment of the data transfer assembly.

FIG. 3B illustrates a second embodiment of the data transfer assembly 318B. In this embodiment, the data transfer assembly 318B includes a data transfer device 354B and a data transfer device interface 364B that is integrally formed with the data transfer device 354B. The data transfer device interface 364B transmits data between the data transfer device 354B and the host controller 312 via the host communication link 326B. The library communication link 324B allows data to flow between the data transfer assembly 318B and another data transfer assembly 318 in the same or different media library 16A-D (illustrated in FIG. 1).

Figure 3C:
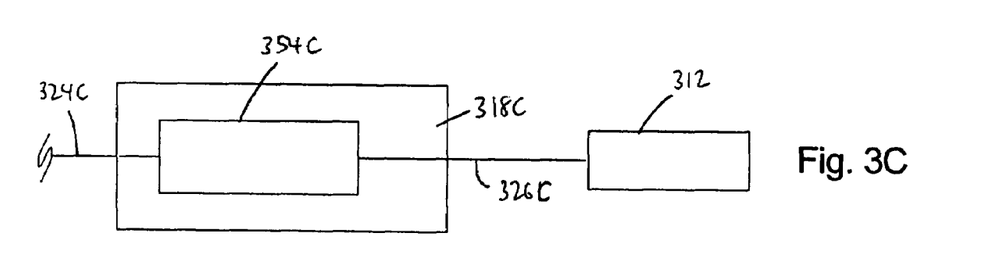
FIG. 3C is a simplified block diagram of the host controller and yet another embodiment of the data transfer assembly.

FIG. 3C illustrates a third embodiment of the data transfer assembly 318C. In this embodiment, the data transfer assembly 318C includes only a data transfer device 354C. In this embodiment, the data transfer device 354C communicates directly with the host controller 312 via the host communication link 326C. The library communication link 324C allows data to flow between the data transfer device 354C of the data transfer assembly 318C and another data transfer assembly 318 in the same or different media library 16A-D (illustrated in FIG. 1).

Figure 3D:
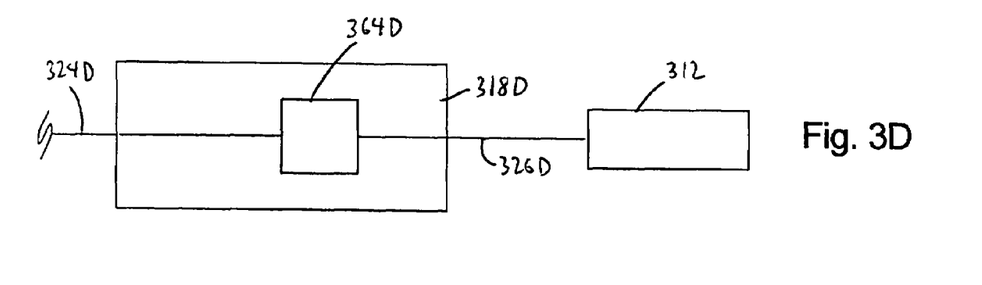
FIG. 3D is a simplified block diagram of the host controller and still another embodiment of the data transfer assembly.

FIG. 3D illustrates a fourth embodiment of the data transfer assembly 318D. In this embodiment, the data transfer assembly 318D is an emulated media drive and includes only a data transfer device interface 364D. Thus, the data transfer assembly 318 does not receive storage media cartridges 22 (illustrated in FIG. 1) and therefore does not directly read and/or write data to any storage media 22. The data transfer device interface 364D communicates directly with the host controller 312 via the host communication link 326D. The library communication link 324D allows data to flow between the data transfer assembly 318D and another data transfer assembly 318 in the same or different media library 16A-D (illustrated in FIG. 1).

Each of the data transfer assemblies 318A-D provided herein are capable of performing protocol conversion functions known to those skilled in the art. For example, each data transfer assembly 318A-D can include routing and protocol conversion logic (not shown) for processing, including e.g. protocol conversion such as from SCSI-3 over Fiber Channel Protocol to SCSI-2 over parallel SCSI, data stream splitting or data duplication for tape mirroring and Tape Group Parity applications, data stream routing/forwarding for drive failover applications, parity calculations and management for Tape Group Parity applications, NDMP services and protocol conversion between NDMP API and parallel SCSI commands, etc.

In one example embodiment, the data transfer device 354 and/or the data transfer device interface 364 can include one or more printed circuit boards. In one such embodiment, one board can include core processing logic, and a second board can include I/O interfaces which determine characteristics of the interface with the host controller 312 and the corresponding data transfer device 354, if applicable. Other configurations and embodiments for the data transfer device interface 364 are possible, and contemplated by the present invention. Examples of device that perform protocol conversion functions are described in U.S. Pat. No. 6,766,412, issued Jul. 20, 2004 and assigned to Quantum Corporation, assignee of the present invention, the contents of which are incorporated herein by reference.

Operation of the Media Library Assembly

Referring again to FIG. 1, functions of the present invention will now be described. As provided in FIG. 1, the host controller 12 communicates with one of the media libraries 16C (shown in FIG. 1 by the host communication link 26) to request that the media library 16C perform a specific operation relative to a particular storage media (i.e. tape cartridge). For example, the host controller 12 may send a first command signal via host communication link 26 to data transfer assembly 18C-2 for transfer of a first block of data, or any other data or binary set (hereinafter collectively referred to as a "block of data" for simplicity) relative to storage media cartridge 22B-4, which the host controller believes is within the media library 16C, and is therefore accessible to data transfer assembly 18C-2.

Upon receipt of the first command signal from the host controller 12, data transfer assembly 18C-2 can determine the location of storage media cartridge 22B-4 by accessing an inventory database (not shown). In this example, data transfer assembly 18C-2 determines that the storage media cartridge 22B-4 is not located within media library 16C, and is actually located within media library 16B. At this point, data transfer assembly 18C-2 becomes an initiator by sending a second command signal sequence via library communication link 24B (an Ethernet communication link, as one example) to media library 16B. With this design, data transfer assembly 18C-2 can ultimately comply with the first command signal of the host controller 12, in a manner that is transparent to the host controller 12, as provided in the examples outlined in FIGS. 4-6.

Figure 4:
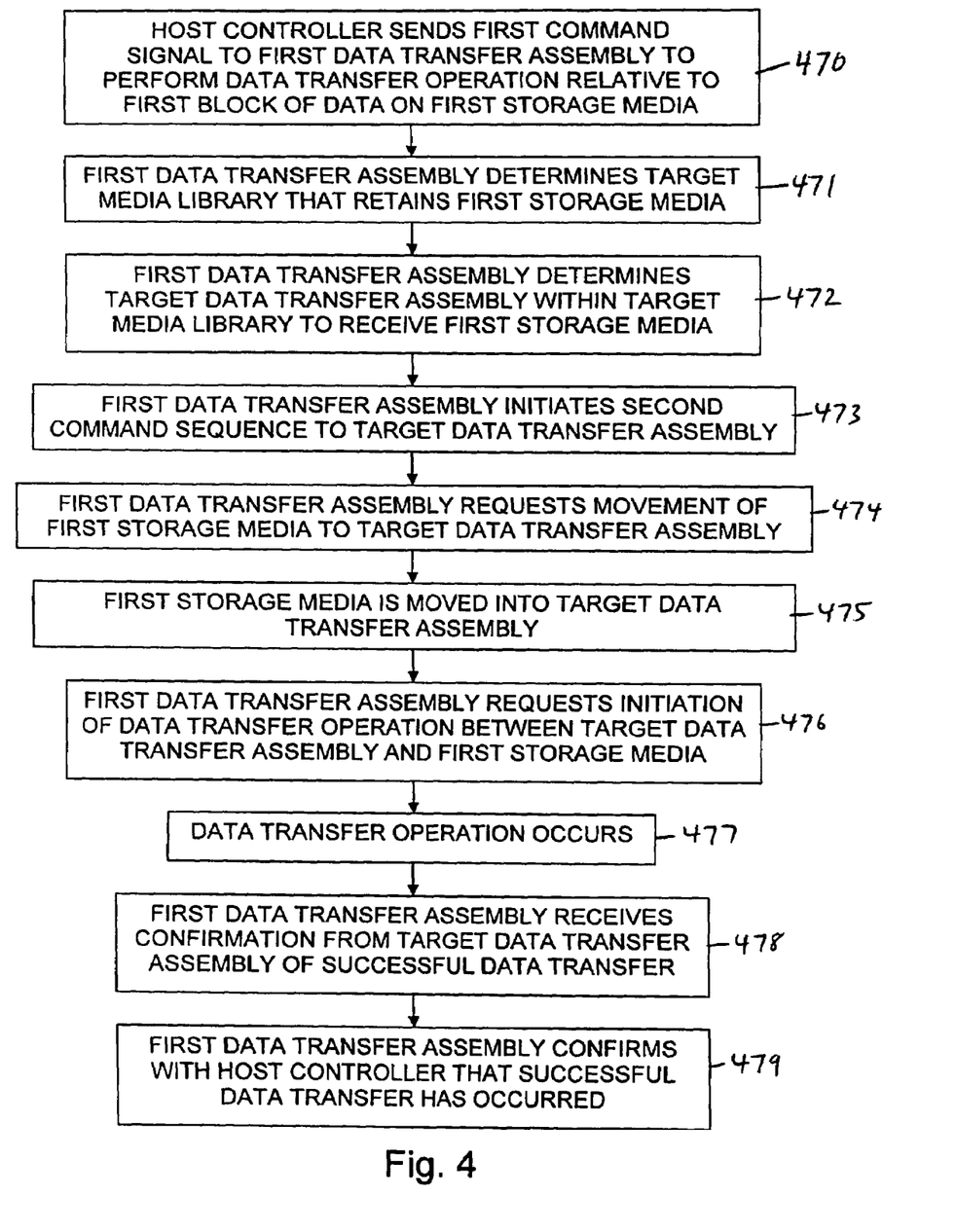
FIG. 4 is a flowchart of one embodiment of steps for operation of the media library assembly.
Figure 5:
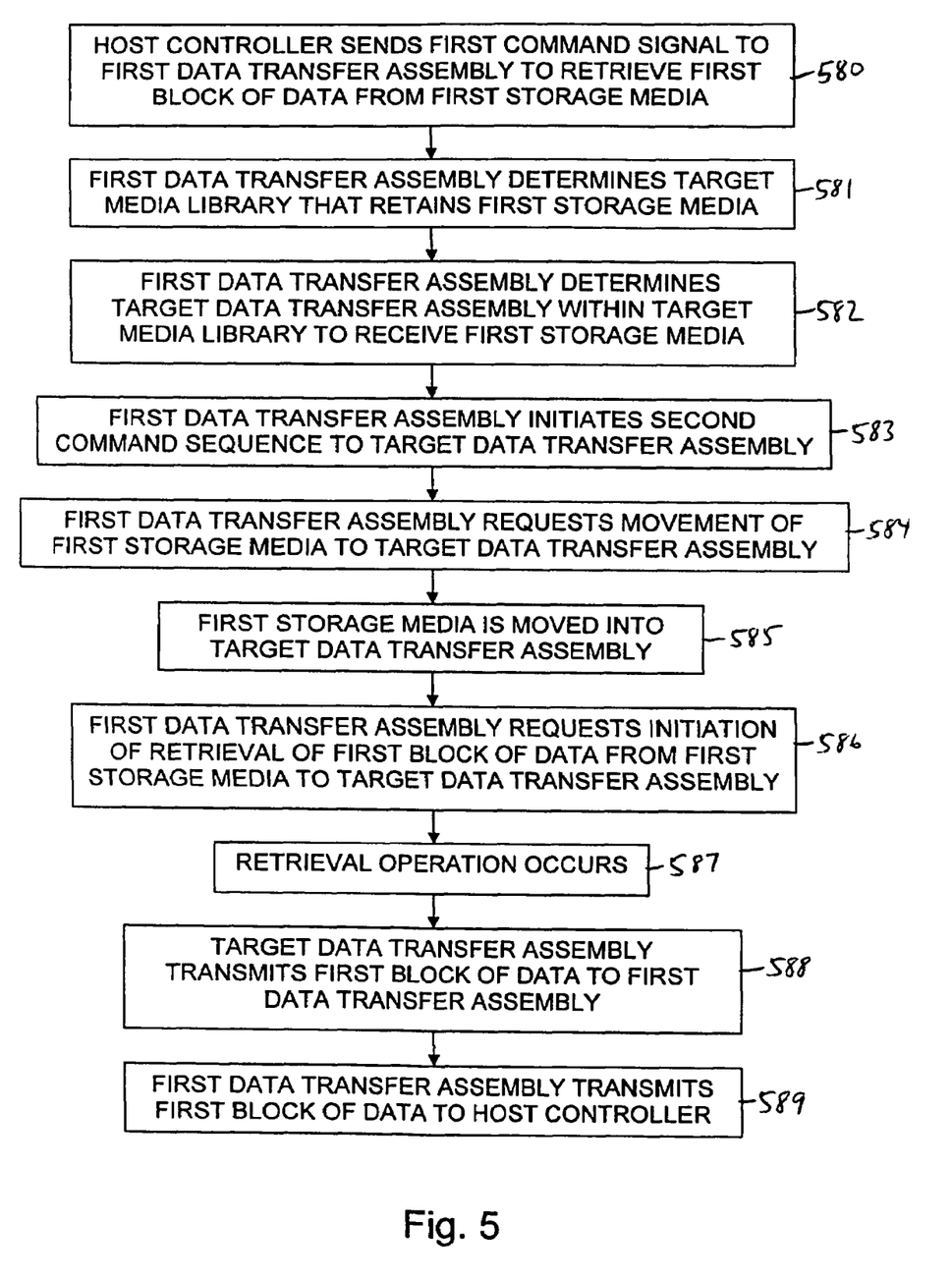
FIG. 5 is a flowchart of another embodiment of steps for operation of the media library assembly.
Figure 6:
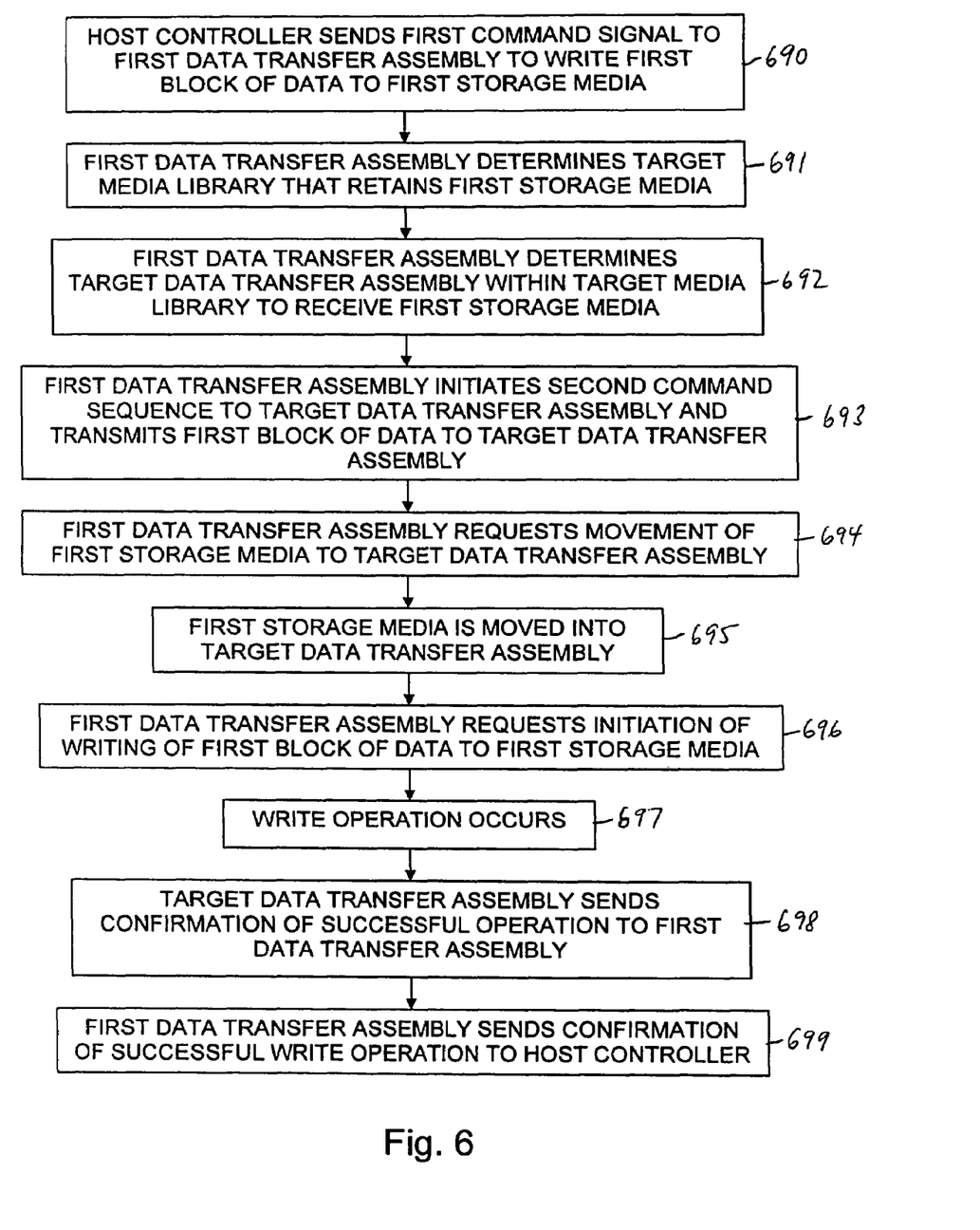
FIG. 6 is a flowchart of still another embodiment of steps for operation of the media-library assembly.

FIGS. 4-6 are example flowcharts of embodiments of various operation steps that can be implemented by the media library assembly 10 for operation according to the present invention. As used herein, data transfer can include e.g. transfer or transmittal of information, requests, commands, responses, control signals, etc. As used with reference to FIGS. 4-6, the terms "first" and "second" are for ease of discussion, and are not intended to specify any one particular structure or operation to the exclusion of any other particular structure or operation.

FIG. 4 provides one embodiment of a flow chart that outlines the steps taken during a general data transfer operation. The operation commences at step 470 with the host controller sending a first command signal via the host communication link to a first data transfer assembly to perform a data transfer operation relative to a first block of data on a target storage media.

At step 471, the first data transfer assembly determines the location of the target storage media within one of the media libraries in the media library assembly, also referred to herein as a target media library or a second media library.

At step 472, the first data transfer assembly determines the most appropriate data transfer assembly (also referred to as a target data transfer assembly or a second data transfer assembly) to perform the operation requested relative to the first block of data and the target storage media. The determination of the target data transfer assembly by the first data transfer assembly can be based upon proximity to the target storage media, the availability of the data transfer assemblies within the media library that houses the target storage media, and any other relevant factors.

At step 473, the first data transfer assembly initiates a second command signal or sequence of signals that are sent to the target data transfer assembly via the library communication link.

At step 474, the second command signal sequence includes requesting movement of the target storage media to the target data transfer assembly by the storage media mover.

At step 475, the target storage media is moved into the target data transfer assembly by the storage media mover.

At step 476, the first data transfer assembly requests initiation of the data transfer operation between the target data transfer assembly and the target storage media.

At step 477, the data transfer operation occurs.

At step 478, the first data transfer assembly receives confirmation from the target data transfer assembly whether the data transfer operation was successful.

At step 479, the first data transfer assembly provides a status to the host controller of the success of the data transfer operation. From the standpoint of the host controller, the first data transfer assembly is directly summoned to perform a data transfer operation, and the first data transfer assembly directly reports the success of the operation back to the host controller. Thus, the function by the first data transfer assembly of becoming an initiator to cause the data transfer operation to occur can be completely transparent to the host controller.

FIG. 5 provides one embodiment of a flow chart that outlines the steps taken during a retrieval or read operation. The operation commences at step 580 with the host controller sending a first command signal via the host communication link to a first data transfer assembly to retrieve a first block of data from a target storage media.

At step 581, the first data transfer assembly determines the location of the target media library that retains the target storage media.

At step 582, the first data transfer assembly determines the target data transfer assembly within the target media library that is to receive the target storage media.

At step 583, the first data transfer assembly initiates a second command signal or sequence of signals to the target data transfer assembly via the library communication link.

At step 584, the first data transfer assembly requests movement of the target storage media into the target data transfer assembly by the storage media mover.

At step 585, the storage media mover moves the target storage media into the target data transfer assembly.

At step 586, the first data transfer assembly requests initiation of retrieval of the first block of data from the target storage media to the target data transfer assembly.

At step 587, the data retrieval operation occurs.

At step 588, the target data transfer assembly transmits the first block of data to the first data transfer assembly.

At step 589, the first data transfer assembly transmits the first block of data to the host controller in compliance with the first command signal from the host controller to the first data transfer assembly. From the standpoint of the host controller, the first data transfer assembly is directly summoned to perform a retrieval operation, and the first data transfer assembly directly retrieves the requested data and provides it to the host controller in a manner completely transparent to the host controller.

FIG. 6 provides one embodiment of a flow chart that outlines the steps taken during a write operation. The operation commences at step 690 with the host controller sending a first command signal via the host communication link to a first data transfer assembly to write a first block of data to a target storage media.

At step 691, the first data transfer assembly determines the location of the target media library that retains the target storage media.

At step 692, the first data transfer assembly determines the target data transfer assembly within the target media library that is to receive the target storage media.

At step 693, the first data transfer assembly initiates a second command signal or sequence of signals to the target data transfer assembly via the library communication link to transmit the first block of data to the target data transfer assembly.

At step 694, the first data transfer assembly requests movement of the target storage media into the target data transfer assembly by the storage media mover.

At step 695, the storage media mover moves the target storage media into the target data transfer assembly.

At step 696, the first data transfer assembly requests initiation of writing the first block of data to the target storage media.

At step 697, the write operation occurs.

At step 698, the target data transfer assembly sends a status regarding the success of the write operation to the first data transfer assembly.

At step 699, the first data transfer assembly provides a status of the success of the write operation to the host controller in compliance with the first command signal from the host controller to the first data transfer assembly. From the standpoint of the host controller, the first data transfer assembly is directly summoned to perform a write operation to a specific storage media, and the first data transfer assembly performs the operation in a manner completely transparent to the host controller.

It is recognized that the embodiments provided relative to FIGS. 4-6 are provided as representative examples. Other embodiments can be utilized with the present invention which may omit one or more steps outlined herein, or may add one or more steps that would be obvious to one skilled in the art. For example, it is within the purview and scope of the present invention that instead of or in addition to retrieving a first block of data from a target storage media to the host controller, the first block of data could be copied to a second storage media in any of the media libraries. In another example, a first block of data could be written to multiple storage media that are stored in the same or different media libraries.

In another embodiment that utilizes a distributed storage media inventory, for example, the host controller can send a first command signal to the first data transfer assembly. The first data transfer assembly can send a second command signal (or sequence) to a second data transfer assembly, which can in turn send a third command signal (or sequence) to a third data transfer assembly to perform a retrieval or write operation. Somewhat similar to the previously described embodiments, the retrieved data can be ultimately transmitted back to the host controller (in the reverse order from above) and/or to any of the data transfer assemblies in any media library. Numerous other examples utilizing the system and methods disclosed herein are possible.

These examples are indicative of the basic premise of the present invention that data can be transferred between any storage media stored in any media drive, and this transfer can occur with a first data transfer assembly as the initiator (after receiving a first command signal from the host controller).

Further, the data transfer occurring downstream from the first data transfer assembly occurs in a transparent manner relative to the host controller.

With the designs provided herein, the media library assembly operates as a "virtual pass-through" mechanism, without the need to physically transfer storage media between media libraries. As a result, the media libraries can be distributed within a building, or across many different locations, for example. Thus, the media library assembly provided herein allows for ease in scalability, as the importance of a physical proximity component is diminished or eliminated. Further, the data transfer can occur across DLT™, SDLT™, LTO™ or other storage media technologies such as optical, for example. In addition, the media library assembly can result in increased reliability and faster performance since no physical pass-through mechanism is required.

While the particular media library assembly 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A media library assembly for use with a plurality of storage media including a target storage media, the plurality of storage media being positioned in a plurality of spaced apart media libraries, the media library assembly comprising:
   a host controller that sends a first command signal to request a transfer of a first block of data relative to the target storage media;
   a first data transfer assembly that receives the first command signal, the first data transfer assembly being configured to determine the location of the target storage media in one of the plurality of media libraries, the first data transfer assembly being configured to initiate a second command signal to request the transfer of the first block of data relative to the target storage media; and
   a spaced apart, second data transfer assembly including a second data transfer device that receives the target storage media, the second data transfer assembly being selected from a plurality of data transfer assemblies by the first data transfer assembly based at least partially on proximity to the target storage media, the second data transfer assembly receiving the second command signal, the second data transfer device being configured to transfer the first block of data relative to the target storage media in response to the second command signal.

2. The media library assembly of claim 1 wherein the first data transfer assembly is configured to return a status to the host controller regarding the transfer of the first block of data.

3. The media library assembly of claim 2 wherein the status of the transfer includes providing the first block of data.

4. The media library assembly of claim 2 wherein the status includes a confirmation that the first block of data has been written to the target storage media.

5. The media library assembly of claim 1 wherein the first command signal includes a request for retrieval of the first block of data from the first data transfer assembly to the host controller.

6. The media library assembly of claim 5 wherein the second command signal includes a request for retrieval of the first block of data from the second data transfer assembly to the first data transfer assembly.

7. The media library assembly of claim 1 further comprising a third data transfer assembly, wherein the second command signal includes a request for transmitting the first block of data from the second data transfer assembly to the third data transfer assembly.

8. The media library assembly of claim 1 wherein the second data transfer device is a tape drive.

9. The media library assembly of claim 1 wherein the first data transfer assembly includes a tape drive.

10. The media library assembly of claim 1 wherein the first data transfer assembly and the second data transfer assembly are substantially identical to one another.

11. The media library assembly of claim 1 wherein the first data transfer assembly is included in a first media library, and the second data transfer assembly is included in a second media library that is remotely positioned from the first media library.

12. The media library assembly of claim 11 wherein the first block of data is transmitted between the first data transfer assembly and the second data transfer assembly via an Ethernet connection.

13. The media library assembly of claim 11 wherein the first block of data is transmitted between the first data transfer assembly and the second data transfer assembly via a Fiber Channel connection.

14. The media library assembly of claim 11 wherein the first block of data is transmitted between the first data transfer assembly and the second data transfer assembly via the Internet.

15. The media library assembly of claim 11 wherein the first block of data is transmitted wirelessly between the first data transfer assembly and the second data transfer assembly.

16. The media library assembly of claim 1 wherein the second command signal occurs transparently to the host controller.

17. The media library assembly of claim 1 wherein the second data transfer assembly includes a storage media retainer and a storage media mover that selectively moves one or more of the storage media between the storage media retainer and the second data transfer device.

18. The media library assembly of claim 17 wherein the first command signal is part of a command sequence that includes a request from the first data transfer assembly to the storage media mover to move the target storage media to the second data transfer device.

19. The media library assembly of claim 1 wherein the target storage media is a tape cartridge.

20. The media library assembly of claim 1 wherein the first data transfer assembly and the second data transfer assembly are both positioned within a same housing of one of the media libraries.

21. The media library assembly of claim 1 wherein the first data transfer assembly includes an emulated media device that initiates the second command signal received by the second data transfer assembly.

22. A media library assembly for use with a plurality of storage media including a target storage media, the media library assembly comprising:
   a host controller that sends a first command signal to retrieve a first block of data from the target storage media;
   a first data transfer assembly that receives the first command signal, the first data transfer assembly being configured to determine the location of the target storage media, the first data transfer assembly being configured to initiate a second command signal to retrieve the first block of data from the target storage media; and
   a spaced apart, second data transfer assembly including a second data transfer device that receives the second command signal, the second data transfer assembly being selected from a plurality of data transfer assemblies by the first data transfer assembly based at least partially on proximity to the target storage media, the second data transfer device being configured to transmit the first block of data from the target storage media to the first data transfer device in response to the second command signal.

23. The media library assembly of claim 22 wherein the first data transfer assembly is configured to send the first block of data received from the second data transfer assembly to the host controller.

24. The media library assembly of claim 22 wherein the second data transfer device is a tape drive.

25. The media library assembly of claim 22 wherein the first data transfer assembly includes a tape drive.

26. The media library assembly of claim 22 wherein the first data transfer assembly and the second data transfer assembly are substantially identical to one another.

27. The media library assembly of claim 22 wherein the first data transfer assembly is included in a first media library, and the second data transfer assembly is included in a second media library that is remotely positioned from the first media library.

28. The media library assembly of claim 27 wherein the first block of data is transmitted between the first data transfer assembly and the second data transfer assembly via an Ethernet connection.

29. The media library assembly of claim 27 wherein the first block of data is transmitted between the first data transfer assembly and the second data transfer assembly via the Internet.

30. The media library assembly of claim 27 wherein the first block of data is transmitted wirelessly between the first data transfer assembly and the second data transfer assembly.

31. The media library assembly of claim 22 wherein the second data transfer assembly includes a storage media retainer and a storage media mover that selectively moves one or more of the storage media between the storage media retainer and the second data transfer device, and wherein the first command signal is part of a command sequence that includes a request from the first data transfer assembly to the storage media mover to move the target storage media to the second data transfer device.

32. The media library assembly of claim 22 wherein the first data transfer assembly and the second data transfer assembly are both positioned within a same housing of a media library.

33. A media library assembly for use with a plurality of storage media including a target storage media, the plurality of storage media being positioned in a plurality of spaced apart media libraries, the media library assembly comprising:
   a host controller that sends a first command signal to write a first block of data onto the target storage media;
   a first data transfer assembly that receives the first command signal, the first data transfer assembly being configured to determine the location of the target storage media in one of the plurality of media libraries, the first data transfer assembly being configured to initiate a second command signal to write the first block of data onto the target storage media; and
   a spaced apart, second data transfer assembly including a second data transfer device that receives the second command signal, the second data transfer assembly being selected from a plurality of data transfer assemblies by the first data transfer assembly based at least partially on proximity to the target storage media, the second data transfer device being configured to write the first block of data to the target storage media in response to the second command signal.

34. The media library assembly of claim 33 wherein the second data transfer device is a tape drive.

35. The media library assembly of claim 33 wherein the first data transfer assembly includes a tape drive.

36. The media library assembly of claim 33 wherein the first data transfer assembly and the second data transfer assembly are substantially identical to one another.

37. The media library assembly of claim 33 wherein the first data transfer assembly is included in a first media library, and the second data transfer assembly is included in a second media library that is remotely positioned from the first media library.

38. The media library assembly of claim 37 wherein the first block of data is transmitted between the first data transfer assembly and the second data transfer assembly via an Ethernet connection.

39. The media library assembly of claim 37 wherein the first block of data is transmitted between the first data transfer assembly and the second data transfer assembly via the Internet.

40. The media library assembly of claim 37 wherein the first block of data is transmitted wirelessly between the first data transfer assembly and the second data transfer assembly.

41. The media library assembly of claim 33 wherein the first data transfer assembly and the second data transfer assembly are both positioned within a same housing of one of the media libraries.

42. A method for transferring a block of data between a host controller and a target storage media, the method comprising the steps of:
   initiating a first command signal from a host controller to a first data transfer assembly to transfer the block of data relative to the target storage media;
   locating the target storage media with the first data transfer assembly;
   selecting a second data transfer assembly to receive the target storage media, the second data transfer assembly being selected from a plurality of data transfer assemblies by the first data transfer assembly based at least partially on proximity to the target storage media; and
   initiating a second command signal with the first data transfer assembly to request the second data transfer assembly to transfer the block of data relative to the target storage media.

43. The method of claim 42 wherein the step of initiating a second command signal includes requesting the second data transfer assembly to retrieve the block of data from the target storage media and transmit the block of data to the first data transfer assembly.

44. The method of claim 42 wherein the step of initiating a second command signal includes requesting the second data transfer assembly to write the block of data to the target storage media.

45. The method of claim 42 wherein the step of initiating a second command signal includes requesting the second data transfer assembly to transfer the block of data between the target storage media and a third data transfer assembly.

46. The method of claim 42 wherein the first data transfer assembly and the second data transfer assembly are substantially identical to one another.

47. The method of claim 42 further comprising the steps of positioning the first data transfer assembly within a first media library, and positioning the second data transfer assembly within a second media library that is remotely positioned from the first media library.

48. The method of claim 42 further comprising the step of transferring the block of data from the second data transfer assembly to the first data transfer assembly via an Ethernet connection.

49. The method of claim 42 further comprising the step of transferring the block of data from the second data transfer assembly to the first data transfer assembly via the Internet.

50. The method of claim 42 further comprising the step of wirelessly transferring the block of data from the second data transfer assembly to the first data transfer assembly.

51. The method of claim 42 further comprising the steps of positioning the first data transfer assembly and the second data transfer assembly within a housing of a single media library.

* * * * *

UNITED STATES PATENT AND TRADEMARK OFFICE
CERTIFICATE OF CORRECTION

PATENT NO.        : 7,515,987 B2                                    Page 1 of 1
APPLICATION NO.   : 11/362967
DATED             : April 7, 2009
INVENTOR(S)       : George A. Saliba It is certified that error appears in the above-identified patent and that said Letters Patent is hereby corrected as shown below:

1. Please replace the word "Fiber" with the word -- Fibre -- in Column 12, Line 22.

Signed and Sealed this

Nineteenth Day of May, 2009

JOHN DOLL
*Acting Director of the United States Patent and Trademark Office*